United States Patent [19]

Clostermeyer et al.

[11] Patent Number: 4,635,543
[45] Date of Patent: Jan. 13, 1987

[54] MOBILE LARGE BALING PRESS

[75] Inventors: Gerhard Clostermeyer, Gütersloh; Werner Könekamp, Herzebrock; Karlheinz Tooten, Harsewinkel, all of Fed. Rep. of Germany

[73] Assignee: Claas Ohg, Harsewinkel, Fed. Rep. of Germany

[21] Appl. No.: 709,780

[22] Filed: Mar. 11, 1985

[30] Foreign Application Priority Data

Mar. 16, 1984 [DE] Fed. Rep. of Germany ....... 3409713

[51] Int. Cl.⁴ ............................................. B30B 3/00
[52] U.S. Cl. ...................................... 100/89; 56/341; 74/67; 74/580
[58] Field of Search ..................... 100/88, 89; 56/341, 56/342, 343; 74/67, 68, 580

[56] References Cited

U.S. PATENT DOCUMENTS

| 331,932 | 12/1885 | Workman | 100/89 |
| 938,146 | 10/1909 | Hibbard | 74/580 X |
| 4,345,421 | 8/1982 | Schwalenberg et al. | 56/341 |

Primary Examiner—Peter Feldman
Attorney, Agent, or Firm—Michael J. Striker

[57] ABSTRACT

A large baling press for forming round bales has a pressing chamber which peripherally is limited by winding elements driven via cranks connected by connecting members, and mass compensating elements are connected with driving elements for the connecting members and cranks.

20 Claims, 8 Drawing Figures

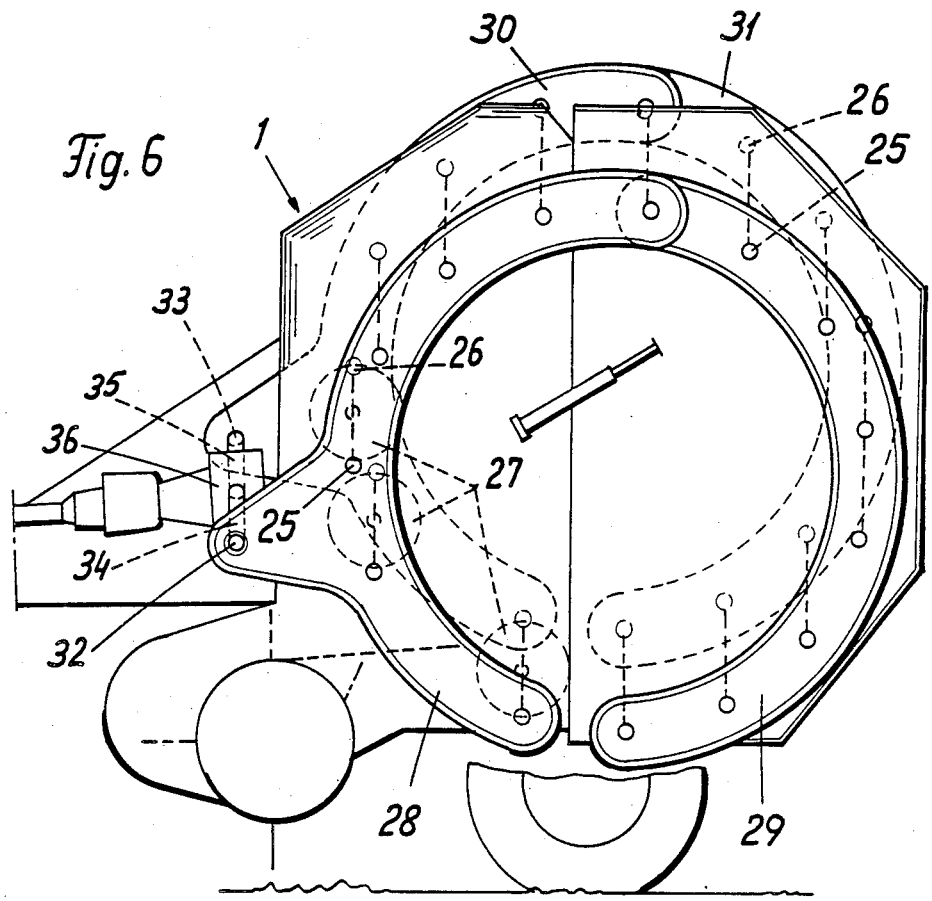
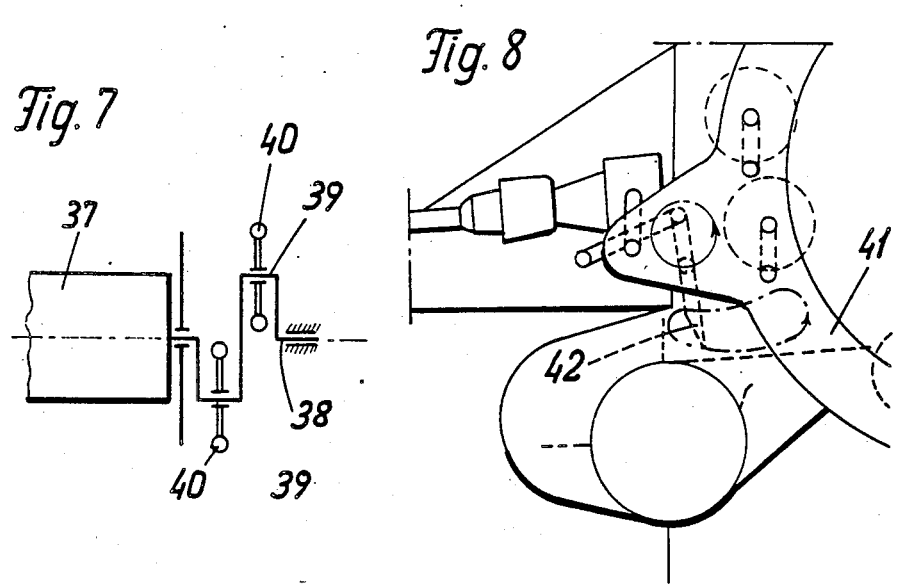

MOBILE LARGE BALING PRESS

BACKGROUND OF THE INVENTION

The present invention relates to a mobile large baling press for agricultural products with winding elements which preferably limit a winding chamber and with two-partite end walls rotatably supporting the winding effects, wherein a rear pressure chamber half is liftable for discharging a finished bale, and a front pressure chamber half has a product supply opening with preceding feeding device.

Such large baling presses are known in the art. The winding elements are formed either as individual winding rollers which peripherally limit the pressure chamber or as winding bands which are guided by respective guiding rollers. In all cases chains are used for providing the winding rollers or the guiding rollers of the winding bands. The disadvantage of the chain drive, particularly in rough agricultural conditions are known for any expert. These disadvantages reside substantially in that the chains must be continuously lubricated. Because of falling dust during harvesting, a very high wear takes place. Moreover, the chains elongate after some time and must be manually tensioned as long as expensive automatically operating tensioning elements are not provided. In addition, the chains produce high noise during the operation.

SUMMARY OF THE INVENTION

Accordingly, it is an object of the present invention to provide a mobile large baling press which avoids the disadvantages of the prior art.

More particularly, it is an object of the present invention to provide a mobile large baling press in which the drive for winding elements is simple, maintance free, and noiseless.

In keeping with these objects and with others which will become apparent hereinafter, one feature of the present invention resides, briefly stated, in a mobile large baling press in which the winding elements have wall ends extending outwardly beyond the side walls and provided with cranks at least at one shaft end, and the cranks are connected with two driveable coupling members each provided with a mass compensating means.

The thus formed large baling press possesses with the use of respective bearings, substantially wear-free and maintenance-free operation. A further advantage of such a large baling press is that because of the mass compensation an exceptionally quiet running is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 6 is a side view of the large baling press in accordance with still a further embodiment of the invention;

FIG. 7 is a view showing an end of the winding roller in accordance with an additional embodiment of the invention; and FIG. 8 is a side view showing a drawing-side region of a large baling press in accordance with the present invention.

DESCRIPTION OF THE PREFERRED EMBODIMENTS

Figure 1:
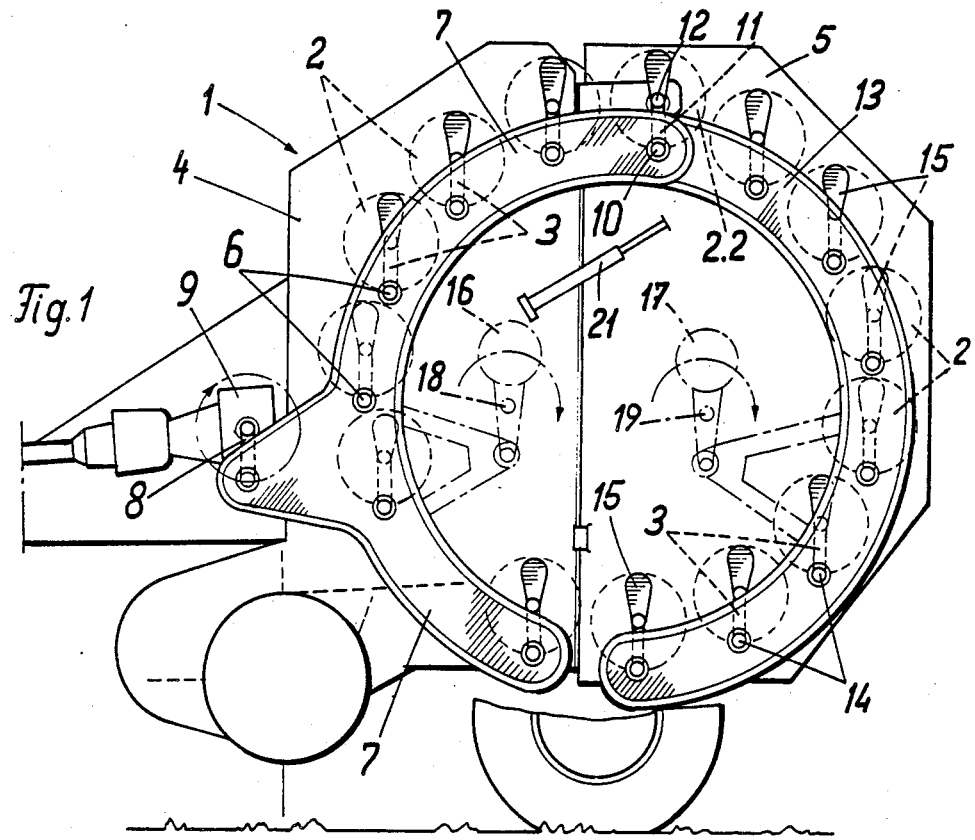
FIG. 1 is a side view of a large baling press in accordance with the present invention.

A mobile large baling press in accordance with the present invention is identified as a whole with reference numeral 1. The press has winding elements which are formed as winding rollers. All winding rollers carry at their one end cranks 3 and are totally supported partially in both fixed end wall halves 4 and partially in turnable end wall halves 5.

A connecting member is arranged on crank pins 6 of the winding rollers 2 supported in the fixed end wall halves 4. The connecting member 7 is driven by a crank 8 of a miter transmission 9. The connecting member 7 is connected not only with the crank pin 6 of the winding rollers supported in the fixed end wall half 4, but it is also connected with a crank pin 10 of a crank 11 which is connected with a highest winding roller 2.2 of the winding rollers supported in the turnable end wall half 5. An axle 12 of this winding roller 2.2 is the axle about which a rear pressing chamber half composed of the end walls 5 and their associated winding rollers 2 can be turned upwardly under the action of a cylinder-piston unit 21.

In addition to the connecting member 7, also a connecting member 13 is arranged on the crank pin 10. The connecting member 13 is connected not only with the crank pin 10 but also with crank pins 14 which serve, via the cranks 3, for driving the winding rollers supported in the turnable end wall halves 5. As can be seen from FIGS. 1 and 2, the winding rollers carry at their ends not only the cranks 3 with their associated crank pins 6, 10 and 14, but also compensating weights 15 which are arranged on the cranks 3 and 11 at their sides opposite to the crank pins 6, 10 and 14. With arrangement of these compensating weights 15, a quiet running is obtained.

Instead of a plurality of the compensating weights 15, the connecting members 7 and 13 can be provided with rotatable compensating weights 16, 17 which are located centrally and shown in broken lines. The compensating weights 16 and 17 are supported rotatably about bearing pins 18 and 19 which are fixedly mounted on side walls, near a point of gravity of each of the drive units. The compensating weights 16 and 17 are supported driveably by the connecting members 7 and 13. A further possibility of the mass compensation is shown in FIC. 2. This Figure illustrates the arrangement of a counterweight 20 which is mounted in the interior of a winding roller 2.

Figure 2:
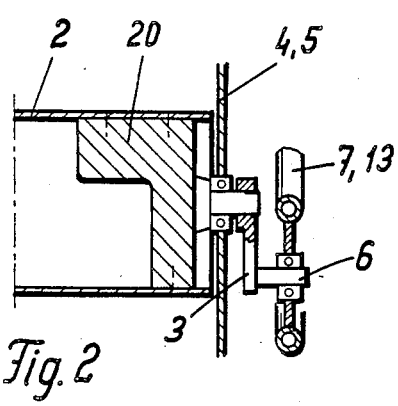
FIG. 2 is a view showing a section of one end of a winding roller of the inventive large baling press.
Figure 3:
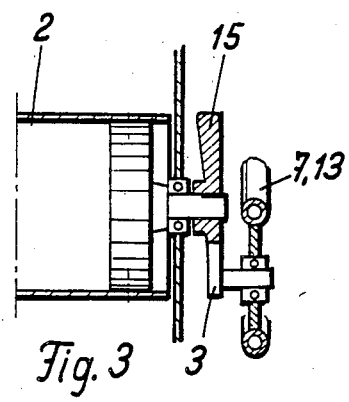
FIG. 3 is a view substantially corresponding to the view of FIG. 2 but showing another embodiment of the present invention.
Figure 4:
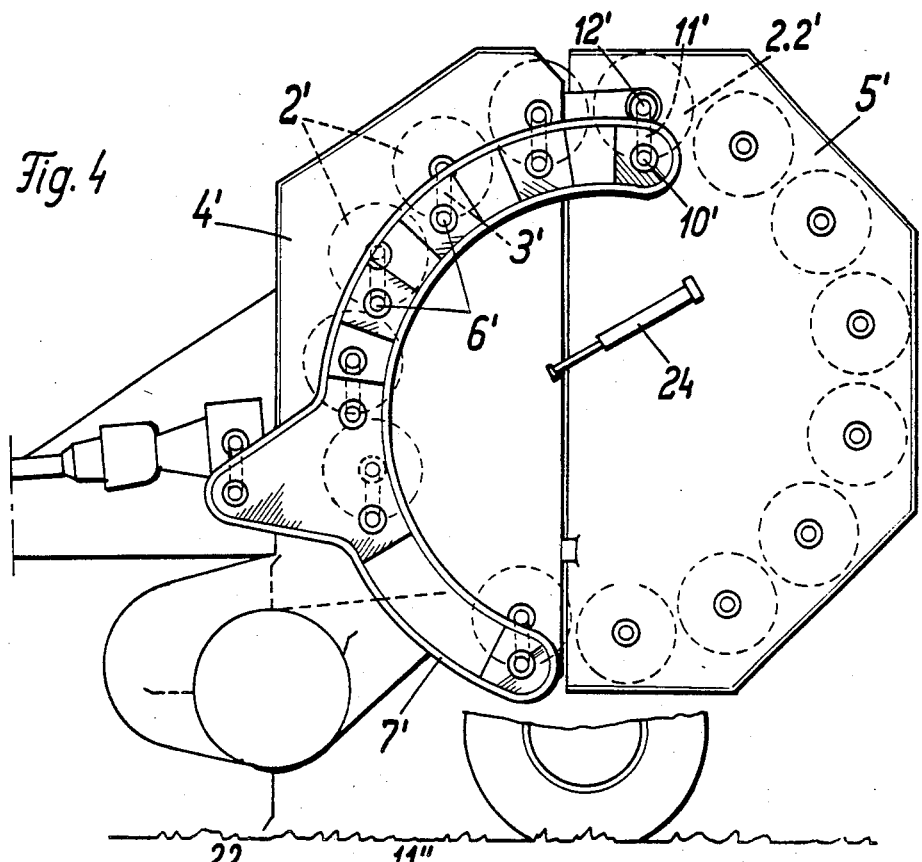
FIGS. 4 and 5 are views showing two opposite sides of the large baling press in accordance with a further embodiment of the present invention.
Figure 5:
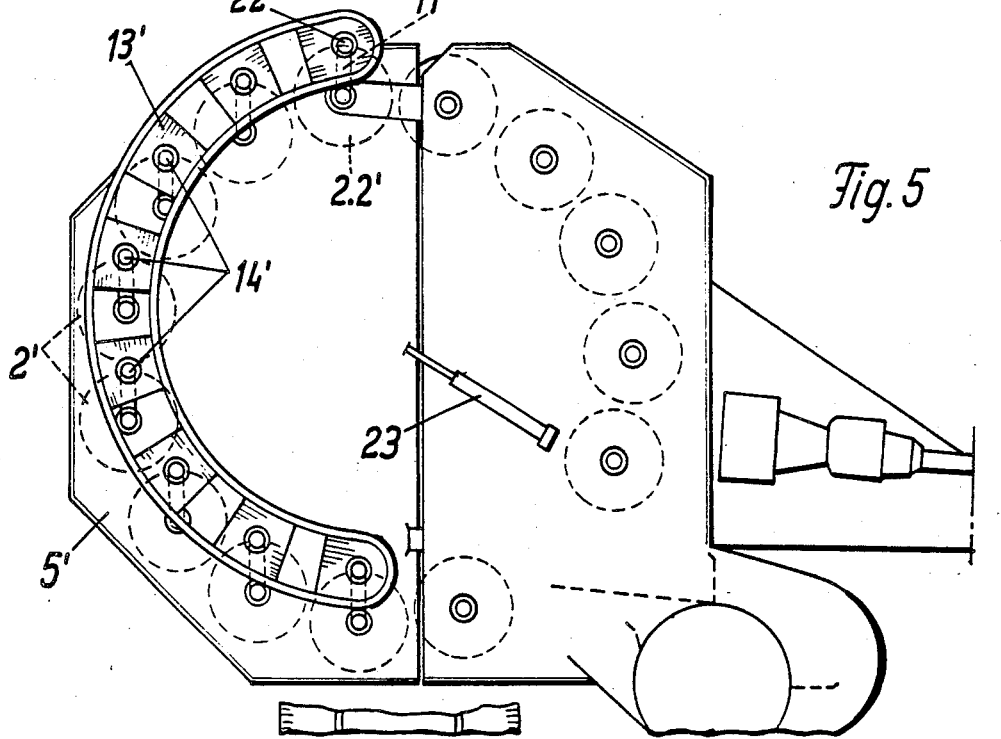

In contrast to the press 1 shown in FIG. 1, the connecting members 7 and 13 can be arranged on opposite meshing sides. This possibility is shown in FIGS. 4 and 5. It can be seen clearly from FIG. 4, that a connecting rod 7' is arranged on crank pins 6' and 10' and serves for driving of a winding roller 2' supported in the fixed end wall halves 4' and the highest winding roller 2.2' supported in the turnable end wall half 5'. An axle 12' of the winding roller 2.2' defines a turning axis of the rear press chamber half. The winding roller 2.2' at its end opposite to the crank pin 10' carries a further crank pin 22 which is offset relative to the crank pin 10' by 180°. This offset is however not absolutely necessary. This crank pin 22 transmits the rotary movement to a further connecting member 13' which is located at the machine side opposite to the connecting member 7' as shown in FIG. 5. The connecting member 13' is connected with crank pins 14' of the winding rollers 2' which are supported outside of the winding roller 2.2' in the turnable end wall half 5'. The turning movement of the rear pressing chamber half is performed by cylinder-piston units 23 and 24, whose piston rods are connected with the end wall halves carrying a connecting member 7' or 14'.

FIG. 6 shows a large baling press 1 having winding rollers which carry at their both ends crank pins 25 and 26 which are offset by 190° relative to one another. Only three winding rollers 27 are shown in the drawing. Such construction utilizes at each end side of the machine, respectively two connecting members 28 and 29 or 30 and 31. The connecting members 28 and 30 are driven by crank pins 32 and 33 which are offset relative to one another by 180°, via cranks 34 and 35 of a miter transmission 36.

FIG. 7 shows a construction in which winding rollers 37 carry first at one end a crank shaft 38 with two bands 39 which are offset relative to one another by 180° and each receive a connecting member 40. Such a construction provides a very quiet running of the machine without additional mass compensating weights, since the masses of both connecting members 40 counteract one another. FIG. 8 shows another embodiment of a press in which a connecting member 41 serves directly for driving of gripper teeth 42 arranged to transport the agricultural product into the winding chamber. The gripper teeth device is not described here in detail, since it can be used in a general form from the DE-OS No. 2,7,166.

It will be understood that each of the elements described above, or two or more together, may also find a useful application in other types of constructions differing from the types described above.

While the invention has been illustrated and described as embodied in a mobile large baling press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A mobile large baling press for agricultural products, comprising a plurality of winding elements having axes and driveable in rotation about said axis, two end walls spaced from one another in an axial direction and forming together with said winding elements a pressing chamber, each of said end walls having two parts so that one part of one of said walls and one part of the other of said walls together with the respective winding elements forms one chamber half, whereas the other part of one of said walls and the other part of the other of said walls together with respective winding elements form another chamber half, one of said chamber halves being immovable and the other of said chamber halves being movable relative to said one chamber half for discharging a finished bale; a plurality of shafts each supporting a respective one of said winding elements and having two shaft ends spaced from one another in the axial direction and extending byond said walls; a plurality of cranks each arranged on at least one shaft end of said winding elements; at least two driveable connecting members connected with said cranks; and a mass compensating means associated with each of said connecting members and including mass compensating elements arranged so that each of said connecting members is provided with one of said mass compensating elements.

2. A mobile large baling press as defined in claim 1; and further comprising two further cranks each arranged to drive a respective one of said connecting members.

3. A mobile large baling press as defined in claim 1, wherein said cranks have connecting points with said connecting members at one side of said cranks, said mass compensating elements including mass compensating weights arranged at opposite sides of at least some of said cranks.

4. A mobile large baling press as defined in claim 1, wherein said winding element is formed as hollow winding rollers, said mass compensating elements including mass compensating weights arranged inside of at least some of said winding rollers in the region of said cranks.

5. A mobile large baling press as defined in claim 1, wherein said mass compensating elements includes two mass compensating weights each connected with a respective one of said connecting members and rotatable about a central bearing pin which is fixed in said walls, said mass compensating weights being driven by said connecting members.

6. A mobile large baling press as defined in claim 1, wherein all said winding elements are provided at their both axial ends with said cranks, two such connecting members being connected at each axial end of said winding elements.

7. A mobile large baling press as defined in claim 1, wherein said winding elements at least at said one axial ends a crank shaft with bands offset relative to one another by 180° and connected with a respective one of said connecting rods.

8. A mobile large baling press as defined in claim 1, wherein at least one of said connecting members is connected with a crank drive for driving a respective press element.

9. A mobile large baling press as defined in claim 8, wherein said crank drive is arranged for driving an agricultural product rowing rake.

10. A mobile large baling press as defined in claim 1; and further comprising a miter transmission which has a crank driving directly one of said connecting means connected with said immoveable chamber half and also drives indirectly said moveable chamber half.

11. A mobile large baling press as defined in claim 10; and further comprising a pulling means drive via which said miter transmission indirectly drives said moveable chamber half.

12. A mobile large baling press as defined in claim 10; and further comprising a cardan drive by which said miter transmission drives said one moveable chamber half.

13. A mobile large baling press as defined in claim 1, wherein said connecting members are formed as closed sheet walls acting as a protecting device.

14. A mobile large baling press as defined in claim 1, wherein said chamber has two axial end sides, said connecting members being arranged so as to overlap in any possible position one of said end sides.

15. A mobile large baling press as defined in claim 1, wherein said connecting members are composed of a light metal.

16. A mobile large baling press as defined in claim 1, wherein said connecting members are provided with drive means which are composed of light metal.

17. A mobile large baling press for agricultural products, comprising a plurality of winding elements having axes and driveable in rotation about said axis; two end walls spaced from one another in an axial direction and forming together with said winding elements a pressing chamber, each of said end walls having two parts so that one part of one of said walls and one part of the other of said walls together with the respective winding elements forms one chamber half, whereas the other part of one of said walls and the other part of the other of said walls together with respective winding elements form another chamber half, one of said chamber halves being immovable and the other of said chamber halves being movable relative to said one chamber half for discharging a finished bale, said one movable chamber half being turnable about an axis which is defined by an axle, said winding elements having a highest winding element which is rotatable about said axis defined by said axle; a plurality of shafts each supporting a respective one of said winding elements and having two shaft ends spaced from one another in the axial direction and extending beyond said walls; a plurality of cranks each arranged on at least one shaft end of said winding elements; at least two driveable connecting members connected with said cranks, said connecting members including a connecting member which is associated with one wall of said immovable chanber half and drives via a respective one of said cranks said movable chamber half, said connecting members including a connecting member associated with the wall of said movable chamber half and turnable via said crank associated with the wall of said immovable chamber half; and a mass compensating means associated with each of said connecting members.

18. A mobile large baling press for agricultural products, comprising a plurality of winding elements having axes and driveable in rotation about said axis; two end walls spaced from one another in an axial direction and forming together with said winding elements a pressing chamber, each of said end walls having two parts so that one part of one of said walls and one part of the other of said walls together with the respective winding elements forms one chamber half, whereas the other part of one of said walls and the other part of the other of said walls together with respective winding elements form another chamber half, one of said chamber halves being immovable and the other of said chamber halves being movable relative to said one chamber half for discharging a finished bale; a plurality of shafts each supporting a respective one of said winding elements and having two shaft ends spaced from one another in the axial direction and extending beyond said walls; a plurality of cranks each arranged on at least one shaft end of said winding elements; at least two driveable connecting members connected with said cranks, said two connecting members being arranged at one end of said winding elements, one of said connecting members connected via the respective cranks with the winding elements of said immovable chamber half and one winding elements of said movable chamber half, whereas the other of said connecting members is connected with the winding elements of said movable chamber half; and a mass compensating means associated with each of said connecting members.

19. A mobile large baling press for agricultural products, comprising a plurality of winding elements having axes and driveable in rotation about said axis; two end walls spaced from one another in an axial direction and forming together with said winding elements a pressing chamber, each of said end walls having two parts so that one part of one of said walls and one part of the other of said walls together with the respective winding elements forms one chamber half, whereas the other part of one of said walls and the other part of the other of said walls together with respective winding elements form another chamber half, one of said chamber halves being immovable and the other of said chamber halves being movable relative to said one chamber half for discharging a finished bale; a plurality of shafts each supporting a respective one of said winding elements and having two shaft ends spaced from one another in the axial direction and extending beyond said walls; a plurality of cranks each arranged on at least one shaft end of said winding elements; at least two driveable connecting members connected with said cranks, one of said connecting members being associated with one wall of said movable chamber half and the other of said connecting members is associated with one wall of said immovable chamber half and said connecting members are located at opposite axial sides of said members, said winding elements including a highest winding element of said movable chamber half and provided at both sides with one of said cranks of which one crank is connected with said connecting member associated with said immovable chamber half; and a mass compensating means associated with each of said connecting members.

20. A mobile large baling press for agricultural products, comprising a plurality of winding elements having axes and driveable in rotation about said axis; two end walls spaced from one another in an axial direction and forming together with said winding elements a pressing chamber, each of said end walls having two parts so that one part of one of said walls and one part of the other of said walls together with the respective winding elements forms one chamber half, whereas the other part of one of said walls and the other part of the other of said walls together with respective winding elements form another chamber half, one of said chamber halves being immovable and the other of said chamber halves being movable relative to said one chamber half for discharging a finished bale; a plurality of shafts each supporting a respective one of said winding elements and having two shaft ends spaced from one another in the axial direction and extending beyond said walls; a plurality of cranks each arranged on at least one shaft end of said winding elements; at least two driveable connecting members connected with said cranks; further connecting members arranged so that each of said chamber halves is provided with two such connecting members with cranks which are offset relative to one another by 180° and connected with the respective connecting members; and a mass compensating means associated with each of said connecting members.

* * * * *